J. H. IRWIN.
Lamps.

No. 138,654. Patented May 6, 1873.

2 Sheets--Sheet 1.

Witnesses
L. H. Kerr.
Geo Bartle

Inventor
John H Irwin
By his Atty
R. D. Smith

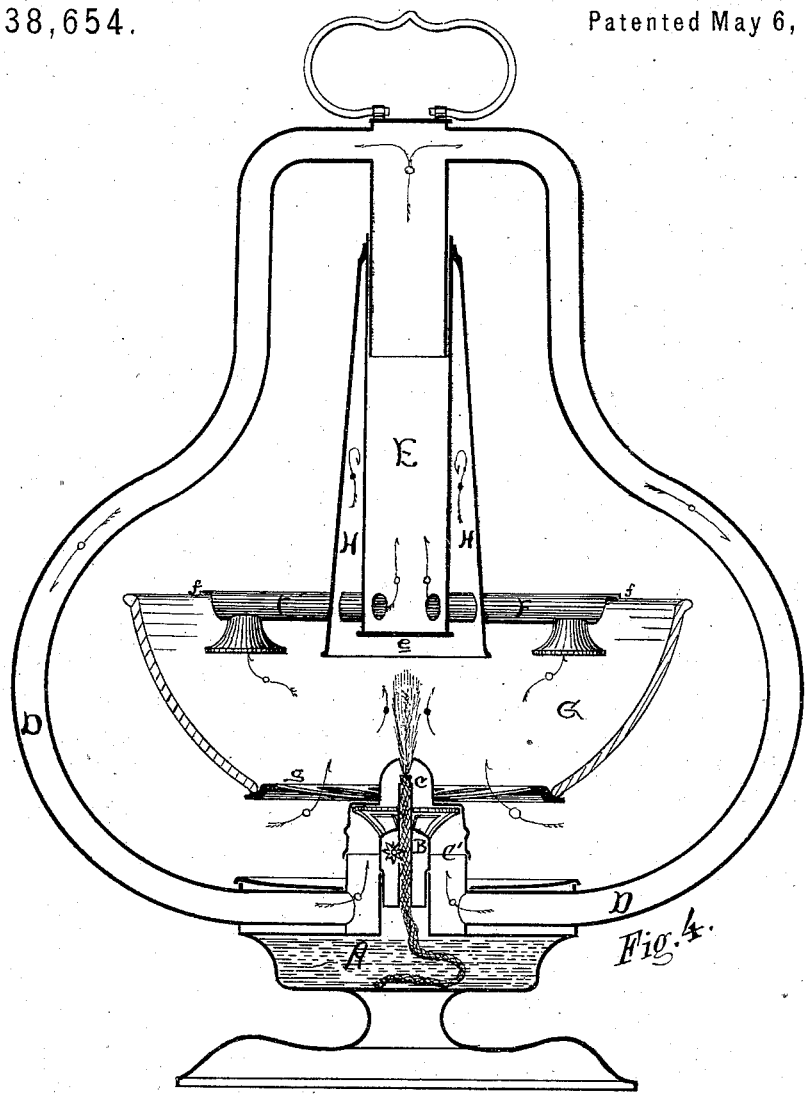
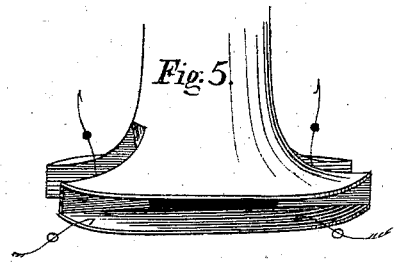

UNITED STATES PATENT OFFICE.

JOHN H. IRWIN, OF PHILADELPHIA, PENNSYLVANIA.

IMPROVEMENT IN LAMPS.

Specification forming part of Letters Patent No. 138,654, dated May 6, 1873; application filed November 5, 1872.

*To all whom it may concern:*

Be it known that I, JOHN HENRY IRWIN, of Philadelphia, in the county of Philadelphia and State of Pennsylvania, have invented a new and useful Improvement in Lamps; and I do hereby declare the following to be a full, clear, and exact description of the same, reference being had to the accompanying drawing, in which—

Figure 1:
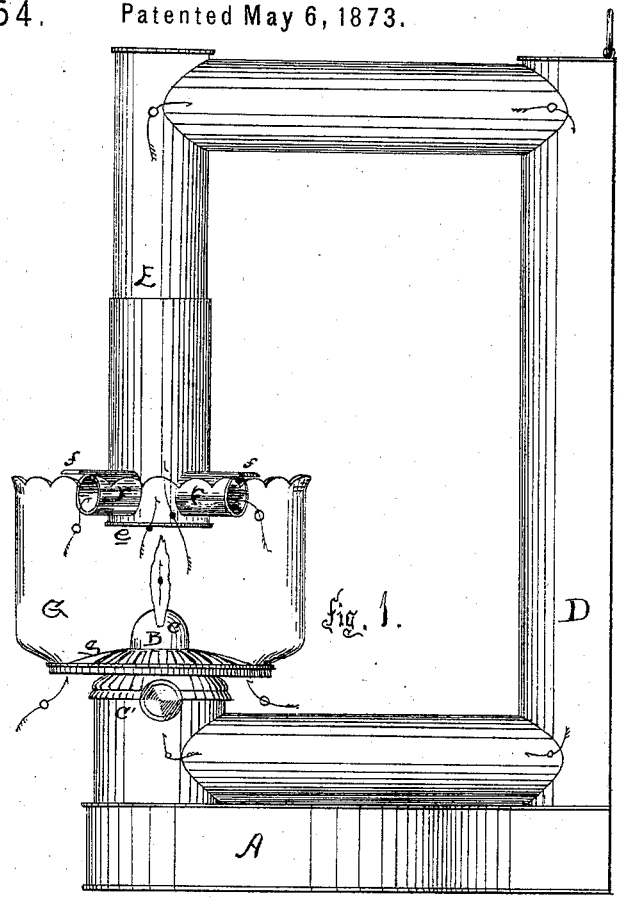
Figure 2:
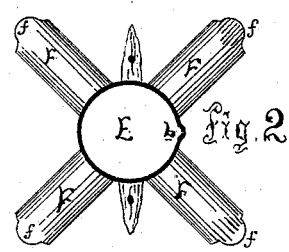
Figure 3:
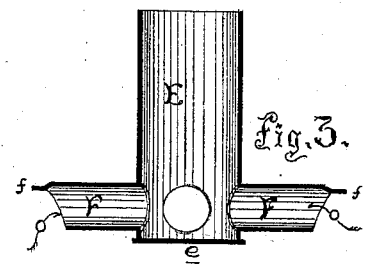

Figure 1 is a side elevation of my lamp. Fig. 2 is a transverse section of the air-tube of the same on line *x x* of Fig. 1. Fig. 3 is a sectional elevation of the air tube and inlets. Fig. 4 represents a modification of the same as a table-lamp. Fig. 5 represents a modified construction of the air-inlet end of the air-tube.

This invention relates to that class of lamps and lanterns known as tubular lamps, in which a tube or tubes are used to convey fresh air from a point above the level of the flame down to the burner to support combustion, whereby the ordinary draft-chimney is dispensed with, and the effect of lateral currents of air is neutralized. The principles upon which said tubular lamps or lanterns operate are well known, being fully set forth in the patents for said lamps and lanterns heretofore granted to me, and hereby referred to.

Heretofore lamps of this class have been constructed either so as to admit a portion of the products of combustion with the fresh air into the air-tubes, or so as to utilize only so much of the heat from the flame as will radiate naturally through the wall of the escape tube or flue.

The object of the present invention is to utilize to the greatest degree the heat from the flame of the lamp to heat the feed-air, and to produce a current through the air-tube without permitting the entrance of any of the products of combustion into said tube; and it therefore consists of a novel construction of the receiving-end of the air-tube, whereby the heat from the flame acts directly upon the tube, and the inlets for fresh air are placed out of the ascending current of products of combustion, and said products are thereby prevented from entering said tube.

That others may fully understand my invention, I will particularly describe it.

For convenience, I shall only describe a side or wall lamp provided with one air-tube only, constructed in my improved manner; but it is evident that to duplicate the air-tubes so as to make the lamp more ornamental or symmetrical, to adapt it to the purposes of a hand-lamp, hanging lamp or chandelier, would not involve any further invention, unless as to details of form or method of constructing the parts.

A is the oil-pot, and B is the burner, surmounted by a slotted cone, C, and surrounded by a jacket, C', forming an air-chamber, from whence there is no egress except through the slot in the cone. D is a descending tube entering the air-chamber below the cone, and communicating at top with the ascending tube E, placed over the flame of the lamp in a vertical line above the slot in the cone, and extending down near enough to the flame to be well affected by the heat thereof, but not near enough to break or elongate the flame by attraction or to obscure the light. The bottom of tube E is closed by the plate *e*, which receives directly the greater portion of heat from the flame. From the sides of the tube E, at or near the bottom, proceed the smaller horizontal radial tubes F, open at or near their outer ends for the admission of fresh air to the tube E. With a burner having a slotted cone the flame ascends in a flat sheet, widening from the cone upward, and the products of combustion continue to flow upward in a similar form until dissipated in the surrounding atmosphere. The radial tubes F carry the openings for the admission of fresh air out of this ascending current of the products of combustion, and none but fresh air gains admittance to the tube E; therefore the radial tubes should be placed diagonally to the slot, or in such a manner that the broad line of the flame will stand away from the inlet-apertures, as shown in Fig. 2. It is preferred to use a protector, G, of glass or other suitable material, not only on account of its ornamental appearance, but for the purpose of preventing the flaring of the flame in lateral currents of air. It has no other value in connection with this lamp.

For the sake of convenience in removing the protector G, which is represented as resting upon the open gallery *g* supported from the cone, the ascending tube E may be made in two parts to telescope or slide one upon the other; and the lower portion of said tube may then be raised to render the removal of the protector G unobstructed. A bead or rib is worked upon one part, as shown at b, Fig. 2, fitting a groove in the other to prevent rotation. From the outer extremity of the radial tubes tips f are prolonged to rest upon and retain the protector G in position. To protect the tube E from the cooling effects of the outside-air currents, I sometimes place an annular jacket, H, around the ascending tube E, closed at the top and open at the bottom, to receive a portion of the hot products of combustion rising from the burner.

The operation of the invention is as follows: The heat of the flame upon the lower end of the tube E rarefies and lightens the column of air in said tube so that a current or flow of air is established upward through the tube E into and downward through the tube D to the burner, and thus a continuous uniform current of fresh hot air is supplied to the flame, while the burned air and products of combustion pass up and are diffused in the surrounding atmosphere, a portion of the heat thereof, however, being utilized in heating the sides of the tube E if the jacket H is employed.

Arrows are employed in the drawing to show the direction of the various currents, the pure air being indicated by arrows supplied with an open circle midway of the shaft, and the burned air and products of combustion being indicated by arrows supplied with a filled or blackened circle.

Instead of employing radial tubes F the tube E may be constructed in a variety of ways so as to place the air-inlets out of the current of burned air rising from the flame without removing said tube E from the direct action of the flame, as for instance, as shown in Fig. 5. These are but modifications of the same device, and do not introduce any new result.

The principal advantages of my present invention are, first, the burner has a larger supply of pure air than heretofore; second, the air is raised to a high temperature before entering the burner, and the flame is thereby intensified.

Having described my invention, what I claim as new is—

1. The combination, in a tubular lamp, of the tube E provided with the radial inlet-tubes F, substantially as set forth.

2. The combination, in a tubular lamp, of the air-tube E with closed bottom e, placed vertically over the flame, and provided with laterally-extended air-inlets so as to receive none but fresh air and heat, the same before it enters the burner, substantially as and for the purpose set forth.

3. The combination, in a tubular lamp, of the tube E, radial tubes F, and heating-jacket H, substantially as specified and shown.

4. The combination, in a tubular lamp, of the radial tube or tubes F, tube E, and protector G, substantially as shown and described.

J. H. IRWIN.

Witnesses:
R. D. O. SMITH,
GEO. BARTLE.